Jan. 3, 1956    W. M. SCHOLL    2,729,193
APPARATUS FOR MAKING ADHESIVE TAPE
Filed Sept. 9, 1950    2 Sheets-Sheet 1
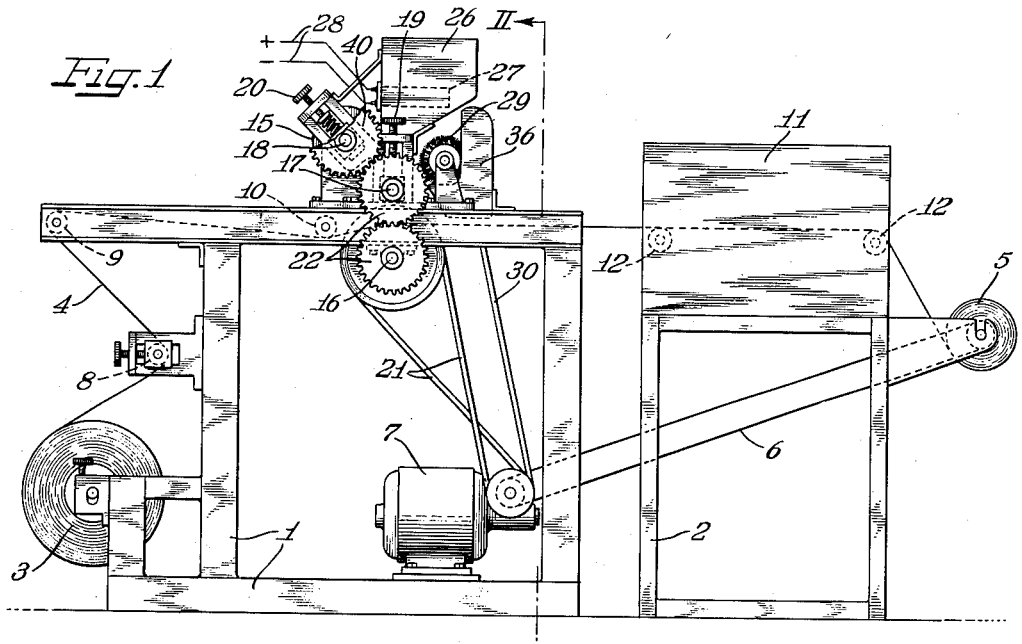
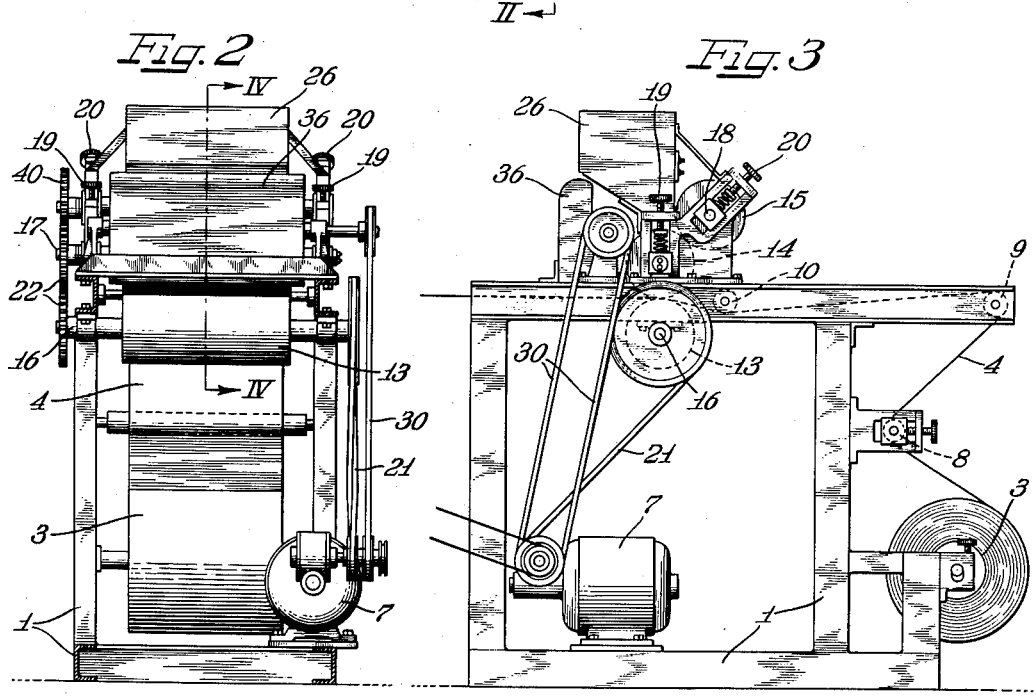
Inventor
William M. Scholl
by The Firm of Charles K. Hill
Attys

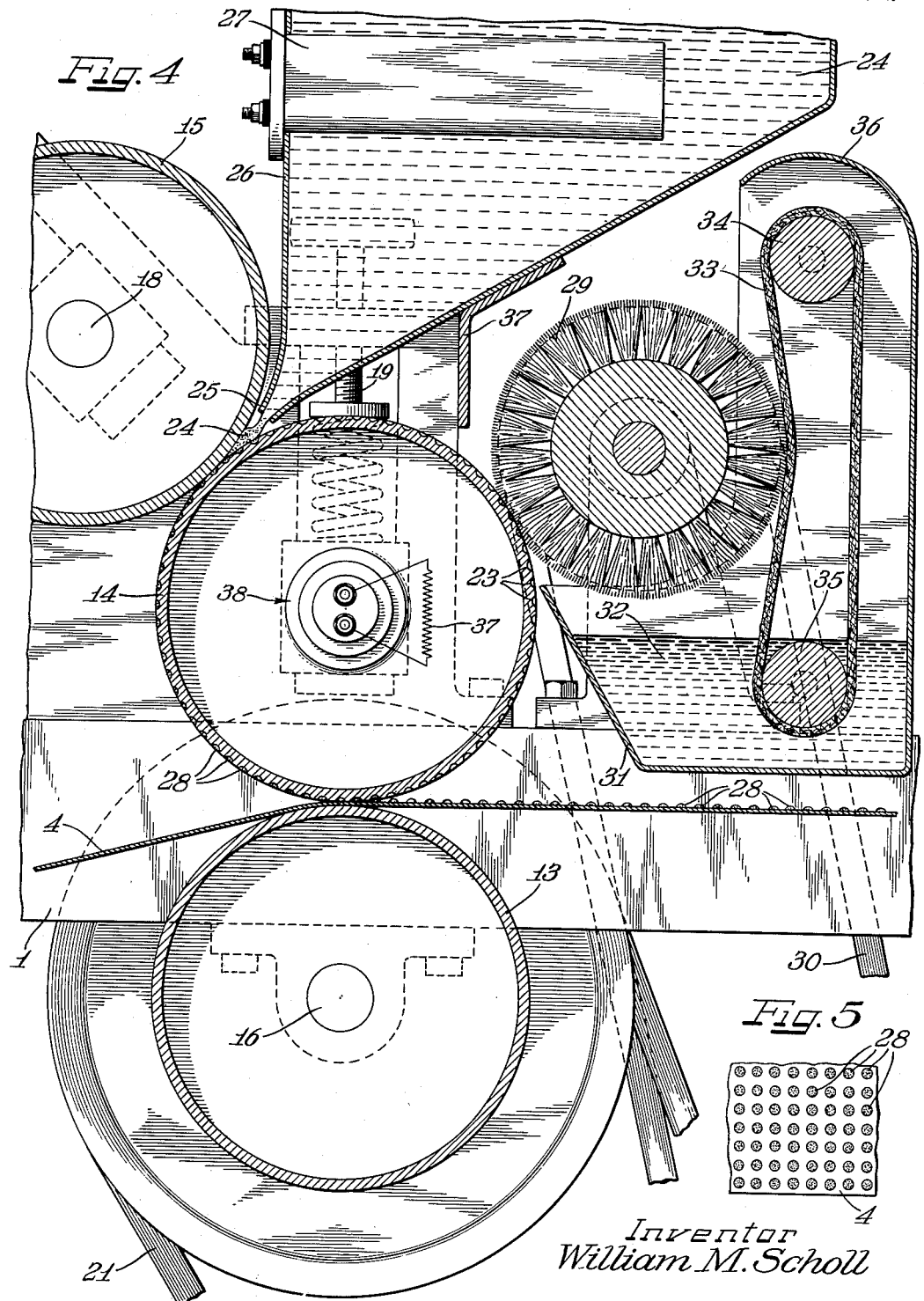

United States Patent Office 2,729,193
Patented Jan. 3, 1956

2,729,193

APPARATUS FOR MAKING ADHESIVE TAPE

William M. Scholl, Chicago, Ill.

Application September 9, 1950, Serial No. 184,076

8 Claims. (Cl. 118—202)

This invention relates to improvements in apparatus for making adhesive tape, and more particularly to the manufacture of adhesive tape highly desirable for application to the human body, such as surgical adhesive tape, although the invention will have other uses and purposes as will be apparent to one skilled in the art.

In the past, many and various types of adhesive tape involving masking tape, binding tape, medical and surgical tape, as well as other kinds have been developed. It is well known, however, that non-porous surgical adhesive tape causes skin irritation to many patients on which it is used. Sometimes such skin irritation becomes extremely aggravating and even leads to infection. It is therefore desirable to provide a porous adhesive tape so that the skin area covered by the tape may have air circulated over a considerable area and thus tend to eliminate the objectionable irritation. At the same time it is desirable that the tape be sufficiently impervious to exclude dirt from the covered surface of the body, and it is essential that the tape be clean and sanitary in appearance, and economical to manufacture and use.

With the foregoing in mind, it is an important object of the instant invention to provide apparatus for making a porous adhesive tape arrangement to deposit numerous relatively small dabs of adhesive on one face of a porous tape-like backing.

Another object of the invention is the provision of apparatus for the manufacture of porous adhesive tape, which apparatus is extremely economical and operates continuously to provide a porous adhesive tape with little attention from an operator.

Another feature of this invention resides in the provision of apparatus for making porous adhesive tape, which apparatus embodies means having a number of indentations in the surface thereof to contact a tape and deposit thereon spaced dabs of adhesive previously received in such indentations.

Still another feature of the invention resides in the provision of an apparatus for making porous adhesive tape, embodying an element arranged to apply spaced dabs of adhesive to one surface of a tape, and means for cleansing such element of any accumulated adhesive immediately after the application of adhesive to the tape.

It is a further object of this invention to provide a substantially continuously operating machine for making porous adhesive tape, embodying a series of rolls including a supply roll, an adhesive applying roll, and a backing roll, the tape passing continuously between the last two said rolls, receiving adhesive during its travel from the applying roll.

Also a feature of the invention resides in the provision of apparatus for the manufacture of porous adhesive tape, embodying a pair of rolls between which a strip of tape of indefinite length may pass, one of said rolls having numerous small indentations in the surface thereof to deposit corresponding spaced dabs of adhesive on one surface of the tape, and means for supplying the indentations with adhesive for deposition on the tape.

While some of the more salient features, characteristics and advantages of the instant invention have been above pointed out, others will become apparent from the following disclosures, taken in conjunction with the accompanying drawings, in which—

Figure 1 is a side elevational view of porous adhesive tape making apparatus embodying principles of the instant invention;

Figure 2 is a transverse vertical sectional view taken substantially as indicated by the line II—II of Fig. 1, looking in the direction of the arrows;

Figure 3 is an elevational view of the left hand portion of the structure of Fig. 1, taken from the other side thereof;

Figure 4 is a greatly enlarged fragmentary vertical sectional view taken substantially as indicated by the line IV—IV of Fig. 2; and Figure 5 is a fragmentary face view of the adhesive side of the finished tape.

As shown on the drawings:

In the illustrated embodiment of this invention, there is shown a main frame 1, and a subframe 2. These frames may well be constructed of angle iron having uprights and cross members wherever needed in the usual manner of frame construction, and they might equally as well be combined into a single frame if so desired.

On on offset portion of the main frame 1 there is a supply or stock roll 3 which carries a supply of naked tape or tape-like backing 4 which may be of any suitable air pervious material. Where the tape is used in connection with medicinal or surgical applications, in most cases it is preferable that the tape be of a relatively finely woven fabric, with the weave such as to be pervious to air but substantially impervious to particles of dirt. It makes no difference whether the tape is woven to permit stretchability or not, and it makes no difference if the tape is elastic or non-elastic. It will also be understood that other materials besides a woven fabric may be utilized, even air impervious material for industrial purposes, but as stated above, for medicinal or surgical use, air pervious tape is most desirable.

On an extended part of the subframe as seen to the right in Fig. 1, a finished tape receiving roll 5 is provided, and this roll is preferably driven by a belt pulley connection 6 or the equivalent from any suitable power source, such as an electric motor 7. As seen in Fig. 1 this receiving roll 5 rotates in a counterclockwise direction to wind up the finished tape.

Between the supply roll 3 and the receiving roll 5 the tape first passes over an adjustable tensioning roll 8, then past a pair of under and over guide rolls 9 and 10 disposed along the bed of the main frame 1, through the adhesive applying mechanism, and on through a tunnel or housing 11 which may contain any suitable form of adhesive drying equipment, this tunnel having therein any necessary number of guide rolls 12. The tension roll 8 and all of the guide rolls 9, 10 and 12 are preferably idlers and rotate only by the frictional contact of the tape therewith.

The adhesive applying mechanism embodies a stack of three rolls including a backing roll 13, an adhesive applying roll 14, and an adhesive supplying roll 15, mounted respectively on shafts 16, 17 and 18 suitably journaled in bearings on the main frame. The applying roll 14 is mounted in floating bearings with a tension applying means on each side thereof as indicated at 19, and the supplying roll 15 is similarly mounted and equipped with pressure means as indicated at 20. Thus, the pressure between the backing roll and the applying roll may be adjusted at will, and the pressure between the supplying roll and the applying roll may similarly be adjusted.

The backing roll 13 is preferably driven by a suitable belt and pulley connection 21 or the equivalent from the motor 7, and obviously this roll rotates clockwise as seen in Fig. 1, oppositely to the receiving roll 5. On the opposite side of the machine, the shafts 16 and 17 of the rolls 13 and 14 are provided with like intermeshing gears 22 so that the adhesive applying roll 14 is driven in synchronism with the backing roll 13. The adhesive supplying or pressure roll 15 need not be driven, but may be left free to rotate by virtue of its contact with the applying roll 14.

With reference to Fig. 4, it will be especially noted that the adhesive applying roll 14 is provided with numerous indentations 23 in its circumferential surface. These indentations are preferably disposed in even rows axially of the roll, to establish a predetermined pattern. The particular nature of the pattern is not essential, except in that it is deemed better to have the adhesive applied to the tape 4 regularly and uniformly rather than haphazardly, but the rows of the pattern may be diagonally across the tape or in substantially any other desired design.

Again, with reference more particularly to Fig. 4, it will be noted that while the rolls 13 and 14 are in vertical alignment, the supply roll 15 is offset from such alignment, and this roll does not contact the roll 14 at a point diametrally opposite the roll 13. With the offsetting of the roll 15, a pocket is provided between the rolls 15 and 14 for the reception of free adhesive 24 discharged through a spout 25 formed in the lower part of an adhesive hopper or magazine 26. Should the adhesive be of the character that preferably is maintained at an elevated temperature, utilization of a suitable heating element 27 may be resorted to. This element 27 may be inside the hopper or outside the hopper as deemed most desirable, and is preferably an electrical element which may be selectively energized through conductors 28 (Fig. 1) connectable to any suitable convenience outlet.

As the rolls operate, adhesive emanating from the spout 25 will be pressed into the indentations 23 on the applying roll 14 in the form of little gobs or dabs 28 by virtue of the pressured contact of the supply roll 15. Preferably the supply roll is adjusted as to its pressure so as to substantially eliminate the application of adhesive to the surface of the applying roll 14 between the indentations. As the roll 14 continues its revolution, it brings the successive dabs 28 of adhesive into contact with the upward dry surface of the tape 4 and the contact of the adhesive dabs with the dry surface of the tape results in the deposition of the spaced dabs of adhesive on the tape, such dabs readily leaving the indentations in the applying roll 14.

Should the adhesive be of such character or composition as to adhere materially to the applying roll 14, or should the adhesive be of such character or composition as to leave traces therebehind after contacting the tape so that an accumulation might be set up on the surface of the applying roll, it may be desirable to cleanse the applying roll and at the same time in effect lubricate the insides of the indentations. To this end, I have provided a rotary brush 29 positioned to contact the surface of the applying roll 14 after the applying roll has contacted the tape and before it again receives adhesive. This brush may be driven from the motor 7 by a suitable belt and pulley assembly 30 and rotates counterclockwise as seen in Fig. 4, the same direction as the applying roll 14, but preferably at a slightly different speed.

Adjacent the rotary brush 29 a vat 31 is provided to contain a cleansing liquid 32 which may be in the nature of a volatile oil. In the preferred arrangement, the brush does not dip into the cleansing liquid directly, but is in contact with a wick 33 of felt or equivalent material that does dip into the liquid itself. As seen in Fig. 4, the wick 33 is in the form of an endless belt mounted on rollers 34 and 35 disposed sufficiently closely to the brush that the adjacent reach of the wick is pressed inwardly slightly to insure positive contact with the brush. The wick may travel around its rollers by virtue of frictional contact with the brush. Thus, the brush is wetted to a desired extent with the cleansing liquid so as not to overwet the surface of the applying roll 14 and the indentations therein, and the brush itself is cleansed of any accumulated adhesive by its contact with the traveling wick. Preferably, in order to avoid any possible spattering of cleansing liquid, a hood 36 encloses the wick on all except the brush side thereof. In addition, it will be noted that the cross member supporting the aforesaid adhesive hopper 26 has a relatively deep downwardly extending flange 37 to prevent a forward throwing of cleansing liquid by the brush in the event the machine is inadvertently operated too rapidly.

It will be noted also that there is some distance of travel between the brush and the point of adhesive reception so that any cleansing liquid deposited on the surface of the applying roll 14 between the indentations has some time to evaporate, such surface application evaporating far more rapidly than an application inside the indentations. Consequently, there should be no difficulty maintaining any distribution of adhesive on the surface of the applying wheel between the indentations to an optimum minimum.

In operation, the above described apparatus is extremely simple, and highly economical. The tape continuously travels from the supply roll 3 to the receiving roll 5, and as it passes between the backing roll and the applying roll it receives the spaced dabs 28 of adhesive on its upper surface. As seen in Fig. 4, the backing roll 13 causes an elevation in the path of travel of the tape so as to insure positive contact between the upper dry surface of the tape and the adhesive gobs carried in the indentations of the applying wheel. The operation is continuous, the applying wheel depositing its dabs of adhesive, then being cleansed of any possible accumulated or remaining adhesive, and then receiving a new supply of adhesive by virtue of its contact with the supply roll 15. As a result, a porous adhesive tape is produced of substantially the character seen in Fig. 5.

Substantially any suitable composition of adhesive mass may be utilized with the instant apparatus, it not being necessary to operate the brush or to operate the heating element 27, if the same are not deemed necessary. For example, where a heavy thick adhesive mass is used, such as a rubber and resin composition mass, the entire hopper 26 and the brush 29 may be eliminated. Further, the rolls 13, 14 and 15, may be in perfect vertical alignment, if so desired. Such a heavy adhesive mass may be first milled on a rubber mill under heat and pressure, and then placed in a warming mill to bring it to a desired consistency, and a predetermined amount may then be picked up by hand, and the entire gob pressed into the space or gap between the pressure roll 15 and the applying roll 14, the mass remaining in that location by virtue of the relative rotation of the rolls as some of it is continuously fed between the rolls, in an amount dependent upon the pressure between the rolls. Such a mass contains no solvent and before being squeezed by roll pressure into a spread can easily be manipulated because of its heavy consistency.

Preferably, with a mass of this character the backing roll 13 remains at substantially room temperature, while the applying roll 14 is preferably heated to a moderate extent to maintain the adhesive in a sufficiently plastic condition as to be readily transferable from the indentations to the tape 4. To this end, any suitable form of heating means may be provided, such as an electrical element 37 inside the roll, the conductors to which may enter through a hollow bearing arrangement generally indicated by numeral 38. By way of a similar heating element 39, the pressure roll is preferably maintained at a temperature sufficiently high to preclude any adhesive sticking to or accumulating on the outer surface of this roll. Obviously, the various temperatures will vary in accordance with the particular adhesive composition utilized, but for a commercial form of rubber and resin adhesive composition, a temperature of approximately 160° F. for the applying roll and a temperature of 220° F. for the pressure roll are satisfactory.

Frequently, a better application of the adhesive mass to the indentations in the applying roll may be had by driving the pressure roll 15 at a slower rate of speed than the backing and applying rolls are driven. To this end, suitable gearing as indicated at 40 in Figs. 1 and 2 may be provided. It should also be understood that the pressure on the applying roll exerted by the pressure roll is sufficient to preclude the deposition of adhesive on the applying roll except in the indentations.

My novel method of making porous adhesive tape is believed to be sufficiently apparent from the foregoing as to warrant no additional description herein.

I claim as my invention:

1. In adhesive tape making apparatus, means defining a path of travel for a tape, a backing roll on one side of the tape path, an adhesive applying roll on the other side of the tape path, said applying roll having indentations in its circumferential surface, means to deliver adhesive to said indentations for application to the tape in spaced dabs, a brush wiping against the surface of said applying roll between the tape and the second said means, and means to moisten said brush with a cleansing liquid.

2. In adhesive tape making apparatus, means to move a strip of tape along a predetermined path, a pair of confronting rolls between which the tape passes and including a backing roll and an adhesive applying roll, said applying roll having numerous adhesive carrying indentations in its circumferential surface, a supplying roll offset and bearing against said applying roll, means to deliver adhesive between the supply and applying rolls, a driven brush to wipe said applying roll between the tape and the supply roll, and means to moisten said brush with cleansing liquid.

3. In adhesive tape making apparatus, a set of three rolls comprising a pressure roll, an applying roll and a backing roll, means to heat the pressure roll to a temperature sufficiently high to prevent adhesive adhering thereto, means to heat the applying roll to a lesser extent insufficiently to preclude the roll picking up the adhesive, said applying roll having spaced indentations in the surface thereof to be filled with adhesive, the pressure of the pressure roll being sufficient to preclude the carrying of adhesive by the applying roll except in said indentations, and means to drive said applying roll and said backing roll in unison to feed a tape therebetween.

4. In adhesive tape making apparatus, a stack of three rolls in superposed relationship, the intermediate roll having spaced indentations in its outer surface in which to pick up adhesive, driving means to actuate said intermediate roll and one other roll in unison to feed a tape therebetween, feeding means disposed to feed adhesive into the nip of the intermediate and third roll, and the third roll pressing against the intermediate roll sufficiently to preclude the application of adhesive passing therebetween except in said indentation, and heating means associated with said third roll to elevate the temperature thereof sufficiently to preclude adhesive adhering thereto.

5. In adhesive tape making apparatus, a stack of three rolls in superposed relationship, the intermediate roll having spaced indentations in its outer surface in which to pick up adhesive, driving means to actuate said intermediate roll and one other roll in unison to feed a tape therebetween, the third roll pressing against the intermediate roll sufficiently to preclude the application of adhesive passing therebetween except in said indentations, and heating means associated with said third roll to maintain the temperature of that roll sufficiently high to preclude adhesive remaining on the surface of said third roll.

6. In adhesive tape making apparatus, a stack of three rolls in superposed relationship, the intermediate roll having spaced indentations in its outer surface in which to pick up adhesive, said intermediate roll being heated to a relatively moderate temperature to maintain the adhesive in said indentations sufficiently plastic to permit ready transferring to a tape, one outside roll being heated to an extent preventing adhesive accumulating thereon, the other outside roll being unheated, and driving means to rotate the intermediate and unheated roll in unison to feed a strip of tape therebetween.

7. An adhesive tape making apparatus comprising a backing roll, an adhesive applying roll, and an adhesive supply roll acting forcibly against said applying roll, said applying roll having spaced indentations into which the supply roll forces adhesive material, heating means associated with said supply roll to elevate the temperature thereof to prevent adhesive adhering thereto, and means to move a clean tape between the applying roll and the backing roll whereby the adhesive in the indentations is transferred in spaced dabs to the tape as the tape moves between said applying and backing rolls.

8. In adhesive tape making apparatus, a set of three rolls comprising a pressure roll, an applying roll and a backing roll, driving means to actuate the applying and backing rolls in unison and in opposite directions to feed a strip of tape therebetween, said applying roll having indentations in the surface thereof which become filled with adhesive entering between the pressure and applying rolls, pressure means urging the pressure roll against the applying roll with sufficient force to prevent adhesive accumulating on the applying roll except in the indentations thereof, and heating means associated with the pressure roll to elevate the temperature thereof sufficiently to preclude adhesive sticking thereto.

References Cited in the file of this patent

UNITED STATES PATENTS

| Number | Name | Date |
|---|---|---|
| 878,958 | Illingworth | Feb. 11, 1908 |
| 2,015,658 | Bezzenberger | Oct. 1, 1935 |
| 2,108,645 | Bryant | Feb. 15, 1938 |
| 2,218,129 | Booty et al. | Oct. 15, 1940 |
| 2,267,982 | Kokay | Dec. 30, 1941 |
| 2,386,731 | Wenzelberger | Oct. 9, 1945 |
| 2,399,545 | Davis | Apr. 30, 1946 |
| 2,542,819 | Kropa | Jan. 21, 1947 |
| 2,432,987 | Garner | Dec. 23, 1947 |
| 2,531,036 | Goettsch | Nov. 21, 1950 |